(12) United States Patent
Chen et al.

(10) Patent No.: US 8,832,088 B1
(45) Date of Patent: Sep. 9, 2014

(54) FRESHNESS-BASED RANKING

(75) Inventors: Zhihui Chen, Menlo Park, CA (US); Cheng Zhu, Zhejiang (CN)

(73) Assignee: Google Inc., Mountain View, CA (US)

( * ) Notice: Subject to any disclaimer, the term of this patent is extended or adjusted under 35 U.S.C. 154(b) by 52 days.

(21) Appl. No.: 13/562,098

(22) Filed: Jul. 30, 2012

(51) Int. Cl.
*G06F 7/00* (2006.01)
*G06F 17/30* (2006.01)
*G06Q 30/02* (2012.01)

(52) U.S. Cl.
CPC .... *G06F 17/30864* (2013.01); *G06F 17/30867* (2013.01); *G06Q 30/02* (2013.01); *G06F 17/30675* (2013.01)
USPC .......................................... 707/723; 707/705

(58) Field of Classification Search
CPC ..................... G06F 17/30864; G06F 17/30867; G06F 17/30675; G06F 17/30696; G06Q 30/02
USPC ................................................. 707/705, 723
See application file for complete search history.

(56) References Cited

U.S. PATENT DOCUMENTS

| | | | |
|---|---|---|---|
| 6,546,388 B1 | 4/2003 | Edlund et al. | |
| 7,272,657 B2 | 9/2007 | Allen et al. | |
| 7,702,672 B2 | 4/2010 | Soulanville | |
| 7,818,315 B2 * | 10/2010 | Cucerzan et al. | 707/723 |
| 8,176,043 B2 | 5/2012 | Iwasa et al. | |
| 8,255,390 B2 | 8/2012 | Inagaki et al. | |
| 8,359,309 B1 * | 1/2013 | Provine et al. | 707/721 |
| 8,375,073 B1 | 2/2013 | Jain | |
| 8,498,974 B1 * | 7/2013 | Kim et al. | 707/706 |
| 2003/0120654 A1 | 6/2003 | Edlund et al. | |
| 2007/0067215 A1 | 3/2007 | Agarwal et al. | |
| 2007/0266025 A1 | 11/2007 | Wagner et al. | |
| 2008/0243819 A1 | 10/2008 | Sareen et al. | |
| 2010/0146531 A1 | 6/2010 | Fu et al. | |
| 2010/0161428 A1 | 6/2010 | Meisel et al. | |
| 2011/0119263 A1 | 5/2011 | Hamada et al. | |
| 2011/0246285 A1 | 10/2011 | Ratnaparkhi et al. | |
| 2011/0246457 A1 | 10/2011 | Dong et al. | |
| 2012/0150831 A1 | 6/2012 | Sun et al. | |
| 2012/0221566 A1 | 8/2012 | Iwasa et al. | |
| 2012/0239643 A1 | 9/2012 | Ekstrand et al. | |
| 2012/0254188 A1 | 10/2012 | Koperski et al. | |
| 2013/0080424 A1 | 3/2013 | Tuttle et al. | |

\* cited by examiner

*Primary Examiner* — Ajay Bhatia
*Assistant Examiner* — Jessica N Le
(74) *Attorney, Agent, or Firm* — Fish & Richardson P.C.

(57) ABSTRACT

Methods, systems, and apparatus, including computer programs encoded on computer storage media, for ranking search results. One of the methods includes receiving a search result obtained in response to a query. A recent impression probability for the query for a recent time period and an overall impression probability for the query for an overall time period are computed. A ratio QtoA of the recent impression probability to the overall impression probability is computed. A determination is made that users prefer newer resources over older resources for the query based on QtoA and that the resource is a new resource. A new score S' is associated with the resource in place of S, wherein the new score S' signifies a better result than the score S signifies, based on determining that users prefer newer resources over older resources for the query, and that the resource is a new resource.

46 Claims, 3 Drawing Sheets

FRESHNESS-BASED RANKING

BACKGROUND

This specification relates to relates to Internet search engines, and more particularly to ranking search results that are identified as being responsive to search queries.

Internet search engines aim to identify resources, e.g., web pages, images, text documents, multimedia content, that are relevant to a user's information needs and to present information about the resources in a manner that is most useful to the user. Internet search engines generally return a set of search results, each identifying a respective resource, in response to a user submitted query.

SUMMARY

This specification describes how a system can adjust a score for a search result that identifies a resource and was obtained in response to a search query to reflect both how "fresh seeking" the query is and how "fresh" the resource is. In general, the system boosts the score for a "fresh" search result if the query is "fresh seeking," and may demote the score if the resource is not fresh. A query is generally considered fresh seeking when users tend to prefer younger resources to older resources provided in response to the query. A resource is generally considered fresh if it is young, i.e. created recently.

In general, one innovative aspect of the subject matter described in this specification can be embodied in methods that include the actions of receiving a search result obtained in response to a query, wherein the search result identifies a resource and has an associated score S; computing a recent impression probability for the query for a recent time period and an overall impression probability for the query for an overall time period, wherein each impression probability corresponds to a ratio of (i) a count of search result impressions selected by users to (ii) a count of all search result impressions presented to users in the respective time periods, wherein the search result impressions were impressions provided in response to the query by a search engine during the respective time period, and wherein the overall time period is a time period that began before the recent time period and is longer than the recent time period; computing a ratio QtoA of the recent impression probability to the overall impression probability; determining that users prefer newer resources over older resources for the query based on QtoA; determining that the resource is a new resource; and associating a new score S' with the resource in place of S, wherein the new score S' signifies a better result than the score S signifies, based on determining that users prefer newer resources over older resources for the query, and that the resource is a new resource. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The overall time period includes the recent time period. The recent time period includes at least one previous day, month, or year. A search result impression is a search result that is selected by a user or ranked above a search result that is selected by a user. S'>S. 6. The actions include determining a query value Q for the query, the query value being based on QtoA; determining a resource value D for the resource, the resource value being based on F(age), wherein age is an age of the resource; and calculating S' as a product of S and a value of a boosting function of the query value Q and the resource value D. The boosting function is a continuous function having a range of values that includes values less than 1, a value equal to 1, and values greater than 1, whereby the product of S and the boosting function can be less than S, equal to S, or greater than S. The boosting function has the form $f(Q, D)=Q^D$. Determining Q comprises determining Q from a maximum QFval of one or more of the following query freshness values: a percentile value of a number of occurrences of the query being received within a first recent time period; percentile value of a number of occurrences of the query on blog web pages within a second recent time period; a percentile value of a number of occurrences of the query on news web pages within a third recent time period; a percentile value of a number of occurrences of the query on social network web pages within a fourth recent time period; a percentile value of a number of occurrences of the query requesting news search results within a fifth recent time period; a percentile value of a ratio of a number of occurrences of the query requesting news search results within a sixth recent time period to a number of occurrences of the query requesting web search results within the sixth recent time period; a percentile value of a number of user selections of news search results provided in response to the query within a seventh recent time period; and a percentile value of a ratio of a number of user selections of news search results provided in response to the query to a number of user selections of web search results provided in response to the query within the eighth recent time period. Q satisfies:

$$Q = \begin{cases} \text{Max}(QFval, QtoA) + 1 : QtoA > 1 \\ \text{Max}(QFval) - QtoA + 1 : QtoA \leq 1 \end{cases}.$$

Q Satisfies:

$$Q = \text{Max}(QFval) \times QtoA + 1.$$

Particular embodiments of the subject matter described in this specification can be implemented so as to realize one or more of the following advantages. Promoting search results for fresh resources in response to fresh-seeking queries allows users to find more relevant results for current events, makes finding fresh resources easier for resources that may be overshadowed by popular but older resources, and reduces the effort that users must exert to find the resources that they seek.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
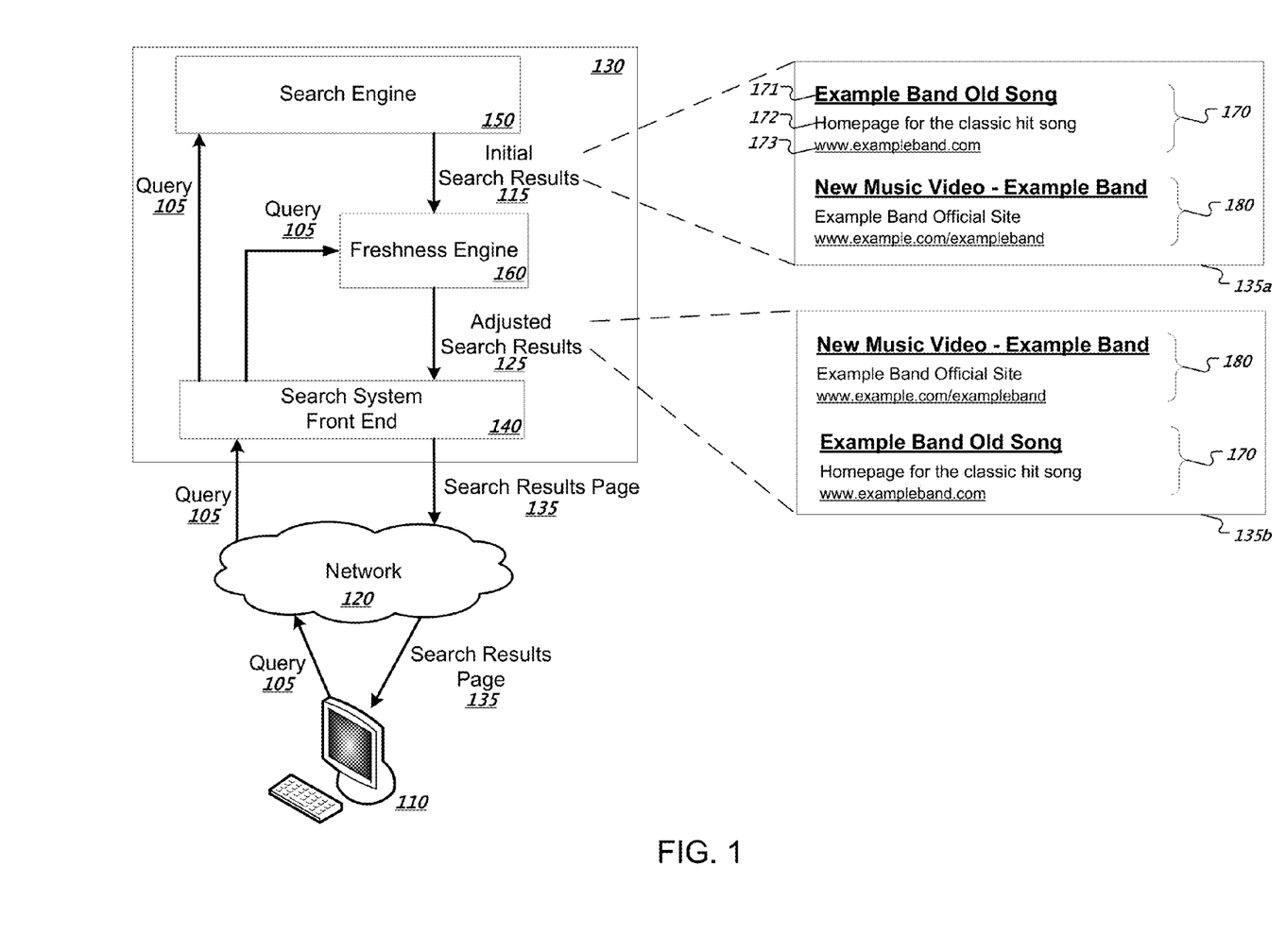
FIG. 1 illustrates an example search system.

FIG. 1 illustrates an example search system 130. The search system 130 is an example of an information retrieval system in which the systems, components, and techniques described below can be implemented.

A user device 110 can be coupled to the search system 130 through a data communication network 120. In general, the user device 110 transmits a query 105 over the network 120 to the search system 130. The search system 130 responds to the query 105 by generating a search results page 135, which is transmitted over the network 120 to the user device 110 in a form that can be presented on the user device 110, e.g., as displayed in a web browser on the user device 110. For example, the search results page 135 can be a markup language document, e.g., HyperText Markup Language or eXtensible Markup Language document. The user device 110 renders the document, e.g., using a web browser, in order to present the search results page 135 on a display device.

The user device 110 can be any appropriate type of computing device, e.g., a server, mobile phone, tablet computer, notebook computer, music player, e-book reader, laptop or desktop computer, PDA (personal digital assistant), smart phone, or other stationary or portable device, that includes one or more processors for executing program instructions and memory. The user device 110 can include computer readable media that store software applications, e.g., a browser or layout engine, an input device, e.g., a keyboard or mouse, a communication interface, and a display device.

The network 120 can be, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination of such networks.

The search system 130 can be implemented as computer programs executing on one or more computers in one or more locations that are coupled to each other through a network, e.g., network 120. The search system generally includes a search system front end 140, a search engine 150, and a freshness engine 160.

In general, the search system front end 140 receives the query 105 from the user device 110. The search system front end 140 routes the query 105 to the appropriate engines included in the search system 130 so that the search system 130 can generate the search results page 135. In some implementations, routing occurs by referencing static routing tables. In other implementations, routing occurs based on the current network load of an engine, in order to accomplish load balancing. In addition, the search system front end 140 can provide the resulting search results page 135 to the user device 110. In doing so, the search system front end 140 acts as a gateway, or interface, between the user device 110 and the search engine 150.

Two or more of a search system front end, a freshness engine and a search engine, e.g., the search system front end 140, the freshness engine 160, and the search engine 150, respectively, may be implemented on the same computing device, or on different computing devices. Because the search system 130 generates the search results page 135 based on the collective activity of the search system front end 140, the freshness engine 160, and the search engine 150, a user of the user device 110 may refer to these engines collectively as a "search engine." This specification, however, refers to a specific engine, e.g. search engine 150, and not the collection of engines, as the "search engine," since the search engine 150 identifies search results in response to the user-submitted query 105.

In addition, the search system 130 can include multiple types of search engines, each search engine designed to obtain a search result for a particular type of resource, e.g., web pages, news articles, images, videos, blog postings, or other types of resources on the Internet. Each such search engine will generally include an indexing engine that indexes resources, and a ranking engine to rank the resources that have been identified. The indexing and ranking of the resources can be performed using conventional techniques.

After receiving the query 105, the search engine 150 obtains initial search results 115 that satisfy the search query. The search engine 150 can assign a search result score to each of the search results 115 and can rank the search results 115 by the assigned search result scores. The search system can generate, e.g. using search system front end 140, a search results page for the initial search results, illustrated as search results page 135a, that identifies search results obtained by the search engine 150. For example, each of the search results can include, but are not limited to, titles, text snippets, images, links, reviews, or other information. For example, the search result 170 includes a title 171, a snippet 172, and a display link 173.

Search results on search results page 135a are ranked by search result scores, with the search results having a higher score being considered to be better search results for the query and thus being presented nearer to the top of the search results page 135a. For example, search result 170 is presented nearer to the top of search results page 135a than search result 180, reflecting that in the initial search results 115, search result 170 has a higher score than search result 180. However, the search system 130 can also use other presentation arrangements and ranking methods, e.g. where a lower score indicates a better search result.

After obtaining initial search results 115, the search system 130 can adjust the ranking of the search results using freshness engine 160. In general, freshness engine 160 considers how "fresh seeking" the query 105 is, and how "fresh" is the resource identified by each search result to adjust the search result scores of the initial search results 115. In this specification, a "fresh seeking" query is a query for which users generally prefer newer resources over older resources, and a "fresh" resource generally indicates a newer resource.

The freshness engine 160 generates adjusted search results 125 by assigning new search result scores to the initial search results 115. The new search result scores can be based on the search result scores initially assigned by the search engine 150, or the new search result scores can be generated anew.

After assigning new search result scores, the ranking of the adjusted search results 125 may, and typically will, differ from the ranking of the initial search results 115. Thus, when the search system 130 generates a search results page 135 using the adjusted search results 125, illustrated as search results page 135b, the ranking of the search results can be different from search results page 135a generated with the initial search results 115. For example, freshness engine 160 can assign a highest search result score to search result 180 for the "New Music Video" of an example band after adjusting the search result scores for freshness.

Figure 2:
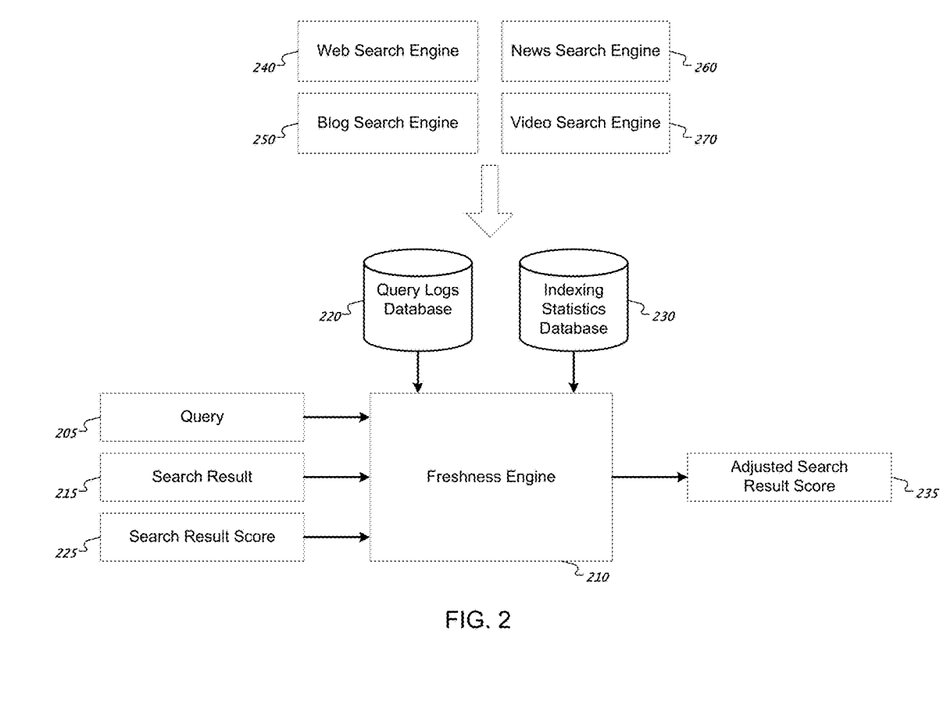
FIG. 2 is a diagram of inputs and outputs of a freshness engine.

FIG. 2 is a diagram of inputs and outputs of an example freshness engine 210. The freshness engine 210 generally receives a query 205, a search result 215, and a search result score 225. The freshness engine 210 then analyzes data from query logs database 220 and indexing statistics database 230 to compute an adjusted search result score 235 for the search result 215.

Query logs database 220 can include user selection data that characterizes visits to particular resources by users and durations of each of those visits. For example, the selection data can identify clicks by users on search results included in search results pages, and, for each of the clicks, a measurement of the duration of time that elapsed between the time that the user clicked on the search result and the time that the user navigated back to the search results web page. The query logs database 220 can include data for each type of resource. A resource type is a classification of a resource based on the type of content included in the resource. Resource types can include, e.g., image resources, media resources, text resources, and so on. Different types of resources can be identified by different types of search engines, e.g. web search engine 240 for identifying web page search results, blog search engine 250 for identifying blog search results, news search engine 260 for identifying news articles, and video search engine 270 for identifying videos.

The system can consider as a click any user action made with respect to a search result that initiates a request for the resource identified by the search result, e.g., a cursor click on a Uniform Resource Locator (URL) of a resource in the search result in a graphical user interface of a web browser. Optionally, in order for a user action to be considered a click, it can also be required that the user's viewing of the resource be for a minimum threshold length of time. The threshold can optionally depend on the type of the resource, the length of the resource, measured in time for a media resource or words for a text resource, or both. For example, the threshold length can be longer for media, e.g., video, than for image resources.

Although the user action with respect to a search result is referred to by this specification as a "click," the action can also be a voice-based selection, or a selection by a user's finger on a presence-sensitive input mechanism, e.g., a touch-screen device, or any other appropriate selection mechanism.

Indexing statistics database 230 can include statistics on occurrences of terms or phrases indexed or otherwise encountered in various types of Internet resources. The various types of search engines, which each will generally include a different type of indexing engine, can contribute various types of statistics to indexing statistics database 230. For example, web search engine 240 can compute statistics on how often a particular term has been encountered during the past month when indexing web pages.

When computing an adjusted search result score 235, the freshness engine 210 can consider both the how fresh-seeking the query 205 is and how fresh the resource identified by the search result 215 is.

The freshness engine 210 can generally consider a particular query to be fresh-seeking if users prefer newer resources over older resources when obtained in response to the particular query. The freshness engine 210 can use a variety of statistical indicators, or "signals," computed from query logs database 220 or indexing statistics database 230 or both to determine that users prefer newer resources over older resources for the query. The freshness engine 210 can compute a measure, a "query freshness value," of how fresh-seeking the query is based on these signals.

For each signal, the freshness engine can either compare the computed query freshness value to a threshold or can compute the query freshness value as a measure of significance, e.g. a percentile value, of the signal within a recent time period, e.g. the past hour, day, week, month, year, etc., for use when computing the adjusted search result score. The time period considered "recent" for each signal need not be the same and may depend on the type of resource the signal is based upon.

An example signal that indicates that a particular query is a fresh-seeking query is a high number of occurrences of the query being received within a recent time period. An atypically high number of occurrences of the query within a recent time period is indicative of a spike in traffic for a query, indicating that the query is a query of recent interest. The freshness engine 210 can access data from the query logs database 220 and count occurrences of the query within a recent time period.

Another example fresh-seeking query signal is a high number of occurrences of terms of the query on blog web pages or social network web pages created within a recent time period. Because blog web pages and social network web pages are frequently updated, a high number of occurrences of terms of the query on blog web pages or social network web pages created within the recent time period is indicative of a query of recent interest. The freshness engine 210 can access indexing statistics database 230 for statistics on terms and phrases indexed by blog search engine 250 during the recent time period.

Another example fresh-seeking query signal is a high number of occurrences of terms of the query on news web pages created within a recent time period. Because news web pages typically discuss current events and topics of recent interest, a high number of occurrences of terms of the query on news web pages created within a recent time period can indicate a query of recent interest. The freshness engine 210 can access indexing statistics database 230 for statistics on terms and phrases indexed by news search engine 260 during the recent time period.

Another example fresh-seeking query signal is a high number of occurrences of the query requesting news search results within a recent time period. For example, the freshness engine 210 can access query logs database 220 to compute a number of queries directed to news search engine 260 during the recent time period.

Another example fresh-seeking query signal is a high ratio of a number of occurrences of the query requesting news search results to a number of occurrences of the query requesting web search results within a recent time period. More users requesting news search results than general web search results for a particular query can indicate a query of recent interest. The freshness engine 210 can access query logs database 220 and compare a count of occurrences of the query requesting general web search results to a count of occurrences of the query requesting news search results.

Another example fresh-seeking query signal is a high number of user selections of news search results provided in response to the query within a recent time period. A high number of user selections of news search results for a query can indicate a query of recent interest. The freshness engine 210 can access query logs database 220 and count user selections of news search results provided in response to the query during the recent time period.

Another example fresh-seeking query signal is a high ratio of a number of user selections of news search results provided for the query to a number of user selections of web search results provided for the query. The freshness engine 210 can for example access query logs database 220 to compare counts of user selections of news or web page search results provided for the query. In addition, the search system can also generate search results pages that include both general web search results and news search results for the same query. In some implementations, in such situations the freshness engine can compute a number of user selections of news search results over web search results provided for the same query.

Another example fresh-seeking query signal is a high ratio QtoA of an impression probability over a recent time period to an overall impression probability. An impression probability can be defined as a probability that a search result impression will be selected by a user. A search result impression can be defined as an instance of a search result being selected by a user or being ranked above a different search result that was selected by the user. In other words, a search result impression can be thought of as an instance of the user seeing the search result. If users typically select the top-ranked search result for a particular query, the impression probability will be higher than if users typically select lower search results for the particular query.

The freshness engine 210 can access query logs database 220 to compute an impression probability over the recent time period and an impression probability over all time, i.e. over all available data. In some implementations, the freshness engine 210 chooses a time period greater than the recent time period to compute the overall impression probability. For example, the recent time period can be one month and the overall impression probability can be computed over one year.

A high ratio QtoA of the impression probability over a recent period to the impression probability over all time suggests that users prefer newer resources over older resources for the particular query. On the other hand, a low ratio QtoA of the impression probability over a recent period to the impression probability over all time suggests that users prefer older resources over newer resources for this particular query.

The freshness engine 210 can generally base the consideration of whether a particular resource is "fresh," i.e. a new resource, based on an age associated with the resource. Based on the age of the document, the freshness engine 210 can compute a resource value D for a resource that will be used to adjust its search result score. If the query 205 is fresh-seeking, the freshness engine 210 can generally boost the search result score for newer resources, i.e. those resources having a high resource value D. In some implementations, the freshness engine 210 can also demote or suppress the search result score for older documents having a low resource value D. Thus, the system can compute a resource value D based on a monotonically decreasing function of the age of the document. In some implementations, the resource value D is based on a reverse sigmoid function. For example, the reverse sigmoid function could map the age of a brand new document to a value of 5.0, could map the age of a three-year-old document to a value of −5.0, and could have a steep drop-off from positive values to negatives values at an age of around one month.

The freshness engine 210 can also adjust the resource value D by considering one or more quality signals for the resource. The freshness engine 210 can multiply, divide, or otherwise adjust the resource value D by the quality signals for the resource. The freshness engine 210 can for example compute quality signals for the resource by accessing data in query logs database 220.

An example quality signal for a resource is a query-independent quality score for a provider of the resource. What the freshness engine 210 considers to be a provider of a resource can depend on the type of resource being considered. For example, the provider of a resource can be considered to be a user account that uploaded the resource, e.g. in the case of user-uploaded images and videos. In some cases, the provider of a resource can be a web site that created the resource.

Another example quality signal for a resource is a query-dependent quality score QtoP for a provider of the resource. In other words, the query-dependent quality score QtoP is a measure of quality for that provider for the query. In some implementations, QtoP for a particular provider is based on a probability that users that issue the query will select any resource from the particular provider that created the resource. For example, if the resources are videos and the provider is a user account, QtoP can be calculated as the number of videos from a particular provider that were selected by users when provided in response to the query divided by a total number of videos selected when provided in response to the query.

Another example quality signal for a resource is a topicality score, which can be based on how well the query matches the resource. The topicality score need not be the same as the initial search result score 215.

Figure 3:
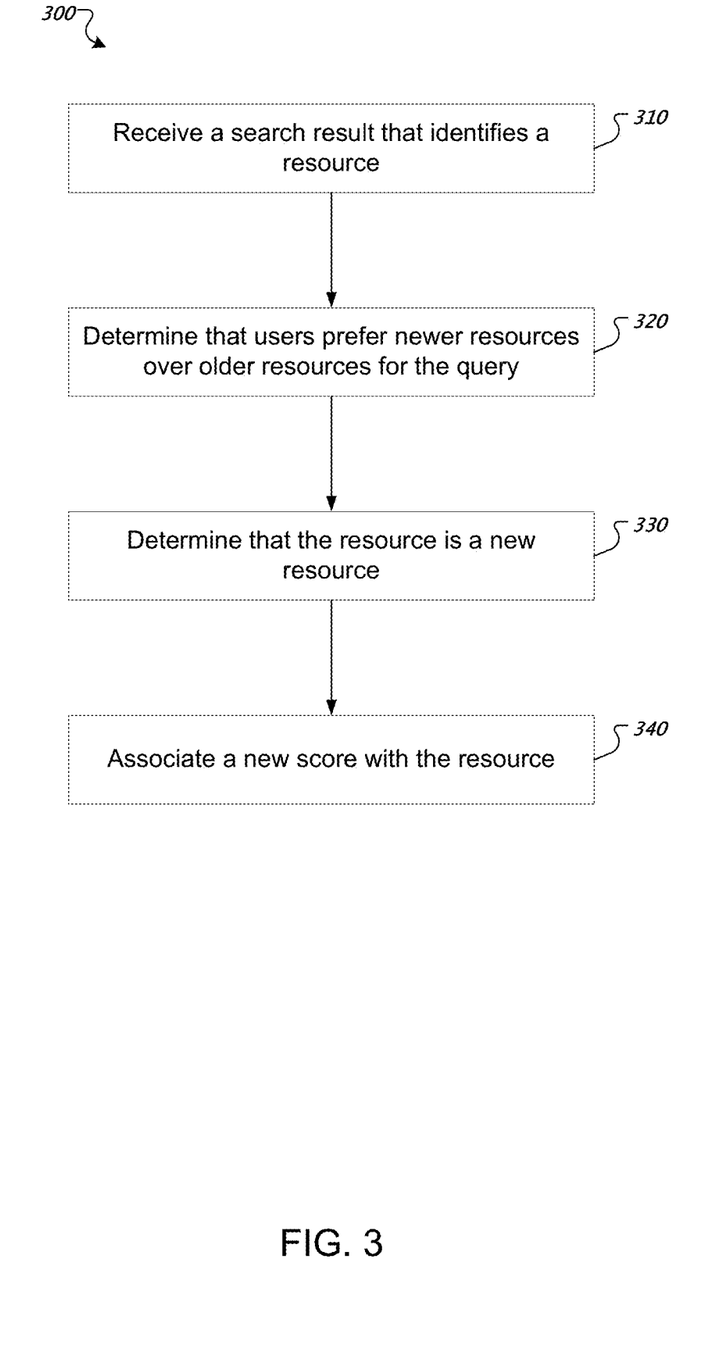
FIG. 3 is a flow chart of an example process for adjusting search result scores for freshness.

FIG. 3 is a flow chart of an example process 300 for adjusting search result scores for freshness. The process 300 can be implemented by one or more computer programs installed on one or more computers. The process 300 will be described as being performed by a freshness engine, for example, the freshness engine 210 of FIG. 2.

The freshness engine receives a search result that identifies a resource (310). The search result can for example be received from one of multiple types of search engines as part of an overall search system.

The freshness engine determines that users prefer newer resources over older resources for the query (320). The freshness engine can for example evaluate multiple fresh-seeking query signals as described above with reference to FIG. 2. In some implementations, if any one of the fresh-seeking query signals exceeds a global or signal-specific threshold, the freshness engine determines that users prefer newer resources over older resources for the query. In some implementations, the freshness engine normalizes all of the fresh-seeking query signals and chooses the fresh-seeking query signal that has the maximum value. For example, the freshness engine can normalize the fresh-seeking query signals by computing percentile values for each of the fresh-seeking query signals.

The freshness engine determines that the resource is a new resource (330). The freshness engine can determine that a resource is new by defining a function based on an age of the resource F(age). In some implementations, F(age) is a monotonically decreasing function, for example, a reverse sigmoid function. In some other implementations, F(age) is the age of the document, e.g. measured in days, weeks, months, etc. In some implementations, the freshness engine compares F(age) of the resource to a threshold, e.g. one month. The freshness engine can then consider a resource that satisfies the threshold, e.g. a resource that is younger than one month, to be a new document and can consider a resource that does not satisfy the threshold not to be a new document.

The freshness engine associates a new score with the resource (340). The new score can replace the initial score for the search result and can be used to rerank search results obtained in response to a search query.

The freshness engine can compute the new search result score directly as a function of a query value, Q, that is based on a maximum of the fresh-seeking query signals and a resource value, D, that is based on F(age). In some implementations, the new score is computed as product of the initial search result score S and a boosting function that is function of Q and D. In some implementations, the new score S' is given by:

$$S' = S \times Q^D.$$

In some implementations, the query value Q depends on the query freshness value of QtoA, and is given by:

$$Q = \begin{cases} \text{Max}(QFval, QtoA) + 1 : QtoA > 1 \\ \text{Max}(QFval) - QtoA + 1 : QtoA \leq 1 \end{cases},$$

where QFval is a maximum of normalized query freshness values computed from the fresh-seeking query signals. In some other implementations, the query value Q is given by:

$Q=\text{Max}(QFval) \times QtoA+1$.

In some implementations, D depends on the provider of the resource, and is given by:

$$D = \begin{cases} F(\text{age}) \times G(\text{provider}) \times H(\text{query, provider}) \times \\ \quad I(\text{query, document}) : F(\text{age}) > 0 \\ \dfrac{F(\text{age})}{G(\text{provider}) \times H(\text{query, provider}) \times I(\text{query, document})} : F(\text{age}) \leq 0 \end{cases},$$

where G(provider) is the query-independent quality score of the provider, H(query, provider) is the query-dependent quality score QtoP of the provider, and I(query, resource) is the topicality score for the resource and the query.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a search result obtained in response to a query, wherein the search result identifies a resource and has an associated score S;
   computing a recent impression probability for the query for a recent time period and an overall impression probability for the query for an overall time period,
     wherein each impression probability corresponds to a ratio of (i) a count of search result impressions selected by users to (ii) a count of all search result impressions presented to users in the respective time periods,
     wherein the search result impressions were impressions provided in response to the query by a search engine during the respective time period, and
     wherein the overall time period is a time period that began before the recent time period and is longer than the recent time period;
   computing a QtoA ratio of the recent impression probability to the overall impression probability;
   determining that users prefer newer resources over older resources for the query based on the QtoA ratio;
   determining that the resource is a new resource; and
   associating a new score S' with the resource in place of S, wherein the new score S' signifies a better result than the score S signifies, based on determining, that users prefer newer resources over older resources for the query and that the resource is a new resource.

2. The method of claim 1, wherein the overall time period includes the recent time period.

3. The method of claim 1, wherein the recent time period includes at least one previous day, month, or year.

4. The method of claim 1, wherein a search result impression is a search result that is selected by a user or ranked above a search result that is selected by a user.

5. The method of claim 1, wherein S' has a boosted value that is higher relative to boosted scores of other resources that are older than the resource.

6. The method of claim 1, further comprising:
   determining a query value Q for the query, the query value being based on the QtoA ratio;
   determining a resource value D for the resource, the resource value being based on a function of an age of the resource, F(age), wherein age is the age of the resource; and
   calculating S' as a product of S and a value of a boosting function of the query value Q and the resource value D.

7. The method of claim 6, wherein the boosting function is a continuous function having a range of values that includes values less than 1, a value equal to 1, and values greater than 1, whereby the product of S and the value of the boosting function can be less than S, equal to S, or greater than S.

8. The method of claim 6, wherein the boosting function has the form $f(Q, D) = Q^D$.

9. The method of claim 6, wherein determining Q comprises determining Q from a maximum Max(QFval) of one or more of the following query freshness values:
   a percentile value of a number of occurrences of the query being received within a first recent time period;
   percentile value of a number of occurrences of the query on blog web pages within a second recent time period;
   a percentile value of a number of occurrences of the query on news web pages within a third recent time period;
   a percentile value of a number of occurrences of the query on social network web pages within a fourth recent time period;

a percentile value of a number of occurrences of the query requesting news search results within a fifth recent time period;
a percentile value of a ratio of a number of occurrences of the query requesting news search results within a sixth recent time period to a number of occurrences of the query requesting web search results within the sixth recent time period;
a percentile value of a number of user selections of news search results provided in response to the query within a seventh recent time period; and
a percentile value of a ratio of a number of user selections of news search results provided in response to the query within an eighth recent time period to a number of user selections of web search results provided in response to the query within the eighth recent time period.

10. The method of claim 9, wherein Q satisfies:

$$Q = \begin{cases} \text{Max}(QFval, QtoA) + 1 : QtoA > 1 \\ \text{Max}(QFval) - QtoA + 1 : QtoA \le 1 \end{cases}.$$

11. The method of claim 9, wherein Q satisfies:

$Q = \text{Max}(QFval) \times QtoA + 1$.

12. A system comprising:
one or more computers and one or more storage devices storing instructions that are operable, when executed by the one or more computers, to cause the one or more computers to perform operations comprising:
receiving a search result obtained in response to a query, wherein the search result identifies a resource and has an associated score S;
computing a recent impression probability for the query for a recent time period and an overall impression probability for the query for an overall time period,
wherein each impression probability corresponds to a ratio of (i) a count of search result impressions selected by users to (ii) a count of all search result impressions presented to users in the respective time periods,
wherein the search result impressions were impressions provided in response to the query by a search engine during the respective time period, and
wherein the overall time period is a time period that began before the recent time period and is longer than the recent time period;
computing a QtoA ratio of the recent impression probability to the overall impression probability;
determining that users prefer newer resources over older resources for the query based on the QtoA ratio;
determining that the resource is a new resource; and
associating a new score S' with the resource in place of S, wherein the new score S' signifies a better result than the score S signifies, based on determining, that users prefer newer resources over older resources for the query and that the resource is a new resource.

13. The system of claim 12, wherein the overall time period includes the recent time period.

14. The system of claim 12, wherein the recent time period includes at least one previous day, month, or year.

15. The system of claim 12, wherein a search result impression is a search result that is selected by a user or ranked above a search result that is selected by a user.

16. The system of claim 12, wherein S' has a boosted value that is higher relative to boosted scores of other resources that are older than the resource.

17. The system of claim 12, wherein the operations further comprise:
determining a query value Q for the query, the query value being based on the QtoA ratio;
determining a resource value D for the resource, the resource value being based on a function of an age of the resource, F(age), wherein age is the age of the resource; and
calculating S' as a product of S and a value of a boosting function of the query value Q and the resource value D.

18. The system of claim 17, wherein the boosting function is a continuous function having a range of values that includes values less than 1, a value equal to 1, and values greater than 1, whereby the product of S and the value of the boosting function can be less than S, equal to S, or greater than S.

19. The system of claim 17, wherein the boosting function has the form $f(Q, D) = Q^D$.

20. The system of claim 18, wherein determining Q comprises determining Q from a maximum Max(QFval) of one or more of the following query freshness values:
a percentile value of a number of occurrences of the query being received within a first recent time period;
percentile value of a number of occurrences of the query on blog web pages within a second recent time period;
a percentile value of a number of occurrences of the query on news web pages within a third recent time period;
a percentile value of a number of occurrences of the query on social network web pages within a fourth recent time period;
a percentile value of a number of occurrences of the query requesting news search results within a fifth recent time period;
a percentile value of a ratio of a number of occurrences of the query requesting news search results within a sixth recent time period to a number of occurrences of the query requesting web search results within the sixth recent time period;
a percentile value of a number of user selections of news search results provided in response to the query within a seventh recent time period; and
a percentile value of a ratio of a number of user selections of news search results provided in response to the query within an eighth recent time period to a number of user selections of web search results provided in response to the query within the eighth recent time period.

21. The system of claim 20, wherein Q satisfies:

$$Q = \begin{cases} \text{Max}(QFval, QtoA) + 1 : QtoA > 1 \\ \text{Max}(QFval) - QtoA + 1 : QtoA \le 1 \end{cases}.$$

22. The system of claim 20, wherein Q satisfies:

$Q = \text{Max}(QFval) \times QtoA + 1$.

23. A computer-implemented method comprising:
receiving a first search result obtained in response to a query, wherein the first search result identifies a resource and has an associated score S;
computing a first probability that a particular search result provided in response to the query in a recent time period will be selected when a particular user is presented with an opportunity to select the particular search result;

computing a second probability that the particular search result provided in response to the query in an overall time period will be selected when the particular user is presented with an opportunity to select the particular search result;

computing a QtoA ratio of the first probability to the second probability;

determining, based on the QtoA ratio, that users in the recent time period preferred newer resources for the query than users in the overall time period;

determining that the resource is a new resource; and applying a boosting function to S to compute a new score S' for the resource, wherein S' has a boosted value that is higher relative to boosted scores of other resources that are older than the resource.

24. The method of claim 23, wherein the first probability is a recent impression probability for the query for the recent time period, wherein the recent impression probability corresponds to a ratio of (i) a count of search result impressions selected by users in the recent time period to (ii) a count of all search result impressions presented to users in the recent time period.

25. The method of claim 24, wherein the second probability is an overall impression probability for the query for the overall time period, wherein the overall impression probability corresponds to a ratio of (i) a count of search result impressions selected by users in the overall time period to (ii) a count of all search result impressions presented to users in the overall time period.

26. The method of claim 25, wherein a search result impression is a search result that is selected by a user or ranked above a search result that is selected by a user in a ranked list of search results provided for the query.

27. The method of claim 23, wherein determining that users in the recent time period preferred newer resources for the query than users in the overall time period based on the QtoA ratio comprises determining that the QtoA ratio satisfies a threshold.

28. The method of claim 23, wherein determining that the resource is a new resource comprises determining that an age of the resource satisfies a threshold.

29. The method of claim 23, further comprising:

determining a query value Q for the query, wherein the query value is based on the QtoA ratio;

determining a resource value D for the resource, the resource value being based on a function of an age of the resource, F(age); and wherein the boosting function is a boosting function of the query value Q and the resource value D.

30. The method of claim 29, wherein the boosting function has the form $f(Q, D) = Q^D$.

31. The method of claim 29, wherein the function of an age of the resource, F(age), is a monotonically decreasing function of an age of the resource.

32. The method of claim 29, wherein determining Q comprises determining Q from a maximum Max(QFval) of one or more of the following query freshness values:

a percentile value of a number of occurrences of the query being received within a first recent time period;

percentile value of a number of occurrences of the query on blog web pages within a second recent time period;

a percentile value of a number of occurrences of the query on news web pages within a third recent time period;

a percentile value of a number of occurrences of the query on social network web pages within a fourth recent time period;

a percentile value of a number of occurrences of the query requesting news search results within a fifth recent time period;

a percentile value of a ratio of a number of occurrences of the query requesting news search results within a sixth recent time period to a number of occurrences of the query requesting web search results within the sixth recent time period;

a percentile value of a number of user selections of news search results provided in response to the query within a seventh recent time period; and a percentile value of a ratio of a number of user selections of news search results provided in response to the query within an eighth recent time period to a number of user selections of web search results provided in response to the query within the eighth recent time period.

33. The method of claim 32, wherein Q satisfies:

$$Q = \begin{cases} \text{Max}(QFval, QtoA) + 1 : QtoA > 1 \\ \text{Max}(QFval) - QtoA + 1 : QtoA \leq 1 \end{cases}.$$

34. The method of claim 32, wherein Q satisfies:

$Q = \text{Max}(QFval) \times QtoA + 1$.

35. A system comprising:

one or more computers and one or more storage devices storing instructions that are operable, when executed by the one or more computers, to cause the one or more computers to perform operations comprising:

receiving a first search result obtained in response to a query, wherein the first search result identifies a resource and has an associated score S;

computing a first probability that a particular search result provided in response to the query in a recent time period will be selected when a particular user is presented with an opportunity to select the particular search result;

computing a second probability that the particular search result provided in response to the query in an overall time period will be selected when the particular user is presented with an opportunity to select the particular search result;

computing a QtoA ratio of the first probability to the second probability;

determining, based on the QtoA ratio, that users in the recent time period preferred newer resources for the query than users in the overall time period;

determining that the resource is a new resource; and applying a boosting function to S to compute a new score S' for the resource, wherein S' has a boosted value that is higher relative to boosted scores of other resources that are older than the resource.

36. The system of claim 35, wherein the first probability is a recent impression probability for the query for the recent time period, wherein the recent impression probability corresponds to a ratio of (i) a count of search result impressions selected by users in the recent time period to (ii) a count of all search result impressions presented to users in the recent time period.

37. The system of claim 36, wherein the second probability is an overall impression probability for the query for the overall time period, wherein the overall impression probability corresponds to a ratio of (i) a count of search result impressions selected by users in the overall time period to (ii) a count of all search result impressions presented to users in the overall time period.

38. The system of claim 37, wherein a search result impression is a search result that is selected by a user or ranked above a search result that is selected by a user in a ranked list of search results provided for the query.

39. The system of claim 35, wherein determining that users in the recent time period preferred newer resources for the query than users in the overall time period based on the QtoA ratio comprises determining that the QtoA ratio satisfies a threshold.

40. The system of claim 35, wherein determining that the resource is a new resource comprises determining that an age of the resource satisfies a threshold.

41. The system of claim 35, wherein the operations further comprise:
   determining a query value Q for the query, wherein the query value is based on the QtoA ratio;
   determining a resource value D for the resource, the resource value being based on a function of an age of the resource, F(age); and
   wherein the boosting function is a boosting function of the query value Q and the resource value D.

42. The system of claim 41, wherein the boosting function has the form $f(Q, D) = Q^D$.

43. The system of claim 41, wherein the function of an age of the resource, F(age), is a monotonically decreasing function of an age of the resource.

44. The system of claim 41, wherein determining Q comprises determining Q from a maximum Max(QFval) of one or more of the following query freshness values:
   a percentile value of a number of occurrences of the query being received within a first recent time period;
   percentile value of a number of occurrences of the query on blog web pages within a second recent time period;
   a percentile value of a number of occurrences of the query on news web pages within a third recent time period;
   a percentile value of a number of occurrences of the query on social network web pages within a fourth recent time period;
   a percentile value of a number of occurrences of the query requesting news search results within a fifth recent time period;
   a percentile value of a ratio of a number of occurrences of the query requesting news search results within a sixth recent time period to a number of occurrences of the query requesting web search results within the sixth recent time period;
   a percentile value of a number of user selections of news search results provided in response to the query within a seventh recent time period; and
   a percentile value of a ratio of a number of user selections of news search results provided in response to the query within an eighth recent time period to a number of user selections of web search results provided in response to the query within the eighth recent time period.

45. The system of claim 44, wherein Q satisfies:

$$Q = \begin{cases} \text{Max}(QFval, QtoA) + 1 : QtoA > 1 \\ \text{Max}(QFval) - QtoA + 1 : QtoA \leq 1 \end{cases}.$$

46. The system of claim 44, wherein Q satisfies:

$$Q = \text{Max}(QFval) \times QtoA + 1.$$

* * * * *